US006036176A

United States Patent [19]

Rotshtain

[11] Patent Number: 6,036,176

[45] Date of Patent: Mar. 14, 2000

[54] WELDLESS BARRIER CONSTRUCTION

[76] Inventor: Dov Rotshtain, 16 Hahashmonaim Street, Netanya 42298, Israel

[21] Appl. No.: 09/032,650

[22] Filed: Feb. 27, 1998

[51] Int. Cl.[7] .............................. E04H 17/00; A01K 1/00

[52] U.S. Cl. ................................ 256/59; 256/65; 256/21; 256/70; 160/222; 119/503

[58] Field of Search ................................ 256/24, 59, 65, 256/10, 68, 70, 67, 21, 56, 54, 48; 160/222; 119/503

[56] References Cited

U.S. PATENT DOCUMENTS

| | | | |
|---|---|---|---|
| 801,713 | 10/1905 | Dutton | 256/56 |
| 2,969,955 | 1/1961 | Newman | 256/21 |
| 3,841,609 | 10/1974 | Smith | 256/59 |
| 4,030,255 | 6/1977 | Hartmann | 256/67 X |
| 4,181,764 | 1/1980 | Totten | 256/59 X |
| 4,465,262 | 8/1984 | Itri et al. | 25/24 |
| 4,796,384 | 1/1989 | Warwick . | |
| 5,163,658 | 11/1992 | Cleveland | 256/10 |
| 5,268,672 | 12/1993 | Kerr | 340/565 |
| 5,458,428 | 10/1995 | West | 403/252 |
| 5,461,827 | 10/1995 | Lofton . | |
| 5,878,695 | 3/1999 | Gent | 119/503 |

FOREIGN PATENT DOCUMENTS

| | | |
|---|---|---|
| 2801566 | 7/1979 | Germany . |
| 3108394 | 10/1982 | Germany . |

*Primary Examiner*—Lynne H. Browne
*Assistant Examiner*—John R. Cottingham
*Attorney, Agent, or Firm*—Fulbright & Jaworski, LLP

[57] ABSTRACT

A barrier including a plurality of elongate construction elements extending along a first axis and spaced from each other along a second axis substantially perpendicular to the first axis, the construction elements being telescopically extensible along the first axis, and an end of each construction element being formed with a tenon, the tenon being formed with a hole therein, at least one rail extending along the second axis, a plurality of apertures being formed through a thickness of the at least one rail and spaced from each other in correspondence with the spaced construction elements, each tenon mating with and protruding through a corresponding one of the apertures such that the construction element abuts the at least one rail and the hole of the tenon protrudes beyond the thickness of the at least one rail, and a plurality of fasteners, each fastener mating with a corresponding one of the holes so as to attach each construction element with the at least one rail substantially fixedly along the first axis and permitting rotational movement of each construction element about the second axis.

13 Claims, 9 Drawing Sheets

36
42
50
42
40
48
44
12

30
22
26
18
12
30

50
48
46
46
16
42
44
40
36
24
20
18
26
30
30
22
22
III
III
32
14
10
12
12
34
18
18
36
36
50
48

WELDLESS BARRIER CONSTRUCTION

FIELD OF THE INVENTION

The present invention relates to barriers generally, and particularly to apparatus and methods for fastening and constructing barriers.

BACKGROUND OF THE INVENTION

It is well known to construct barriers by welding metal bars. Many types of barriers must be sized to fit certain structures. For example, barriers for windows are usually installed on site by cutting metal bars to match the particular dimensions of the window frame, and then welding the bars together to form the desired barrier configuration.

SUMMARY OF THE INVENTION

The present invention seeks to provide improved barriers and methods for construction thereof The present invention employs novel fasteners and fastening methods for constructing barriers at least as strong as welded barriers, but without the need for welding metal bars together. The barriers may be telescopically extended along a first axis and modularly extended along a second axis, perpendicular to the first direction. The fasteners also provide the installer the freedom to angle the bars with respect to each other as desired. Thus, reliable, sturdy and durable barriers may be easily and quickly constructed using the fasteners and methods of the present invention. The barriers may be further reinforced with solid metal fillers or may be provided with concealed electrical wiring for connection with alarm systems.

It is noted that throughout the specification and claims, the term “barrier” encompasses any type of bounding or supportive structure constructed from elongate and/or slender construction elements, such as bars or rods, and includes, but is not limited to, barriers, fences, gates, window barriers, cages, enclaves and flower bed holders. The terms “elongate construction element” and “slender construction element” are used interchangeably.

There is thus provided in accordance with a preferred embodiment of the present invention, a barrier including a plurality of elongate construction elements extending along a first axis and spaced from each other along a second axis substantially perpendicular to the first axis, the construction elements being telescopically extensible along the first axis, and an end of each construction element being formed with a tenon, the tenon being formed with a hole therein, at least one rail extending along the second axis, a plurality of apertures being formed through a thickness of the at least one rail and spaced from each other in correspondence with the spaced construction elements, each tenon mating with and protruding through a corresponding one of the apertures such that the construction element abuts the at least one rail and the hole of the tenon protrudes beyond the thickness of the at least one rail, and a plurality of grooved pin fasteners, each grooved pin fastener mating with a corresponding one of the holes so as to attach each construction element with the at least one rail substantially fixedly along the first axis and permitting rotational movement of each construction element about the second axis.

In accordance with a preferred embodiment of the present invention, there are provided a plurality of brackets, each bracket comprising a back and at least one leg, the back being provided with at least one passageway, wherein at least one of the construction elements is fixedly attached at one of its ends to a leg of a first one of the brackets, the at least one leg of the first bracket facing a first direction along the first axis, and the at least one of the construction elements slidingly passes through the at least one passageway of a second one of the brackets, the at least one leg of the second bracket facing a second direction along the first axis, opposite to the first direction.

Additionally in accordance with a preferred embodiment of the present invention, there is provided at least one extensor rail which mates with the at least one rail along the second axis, and a locking member which is fixedly attachable to the at least one rail, the at least one extensor rail and the at least one construction element.

Further in accordance with a preferred embodiment of the present invention, the locking member comprises an elongate portion sized to fit in a tenon of the at least one construction element, the elongate portion having a first mating surface and a second mating surface, wherein if the locking member fixedly attaches the at least one rail to the at least one construction element then the first mating surface abuts a portion of the tenon of the construction element, and if the locking member fixedly attaches the at least one rail and the at least one extensor rail to the at least one construction element then the second mating surface abuts a portion of the tenon of the construction element.

Still further in accordance with a preferred embodiment of the present invention, each construction element is hollow and may be reinforced with solid metal fillers or may be provided with concealed electrical wiring.

Additionally in accordance with a preferred embodiment of the present invention, at least one of the construction members is arcuate in shape.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1A:
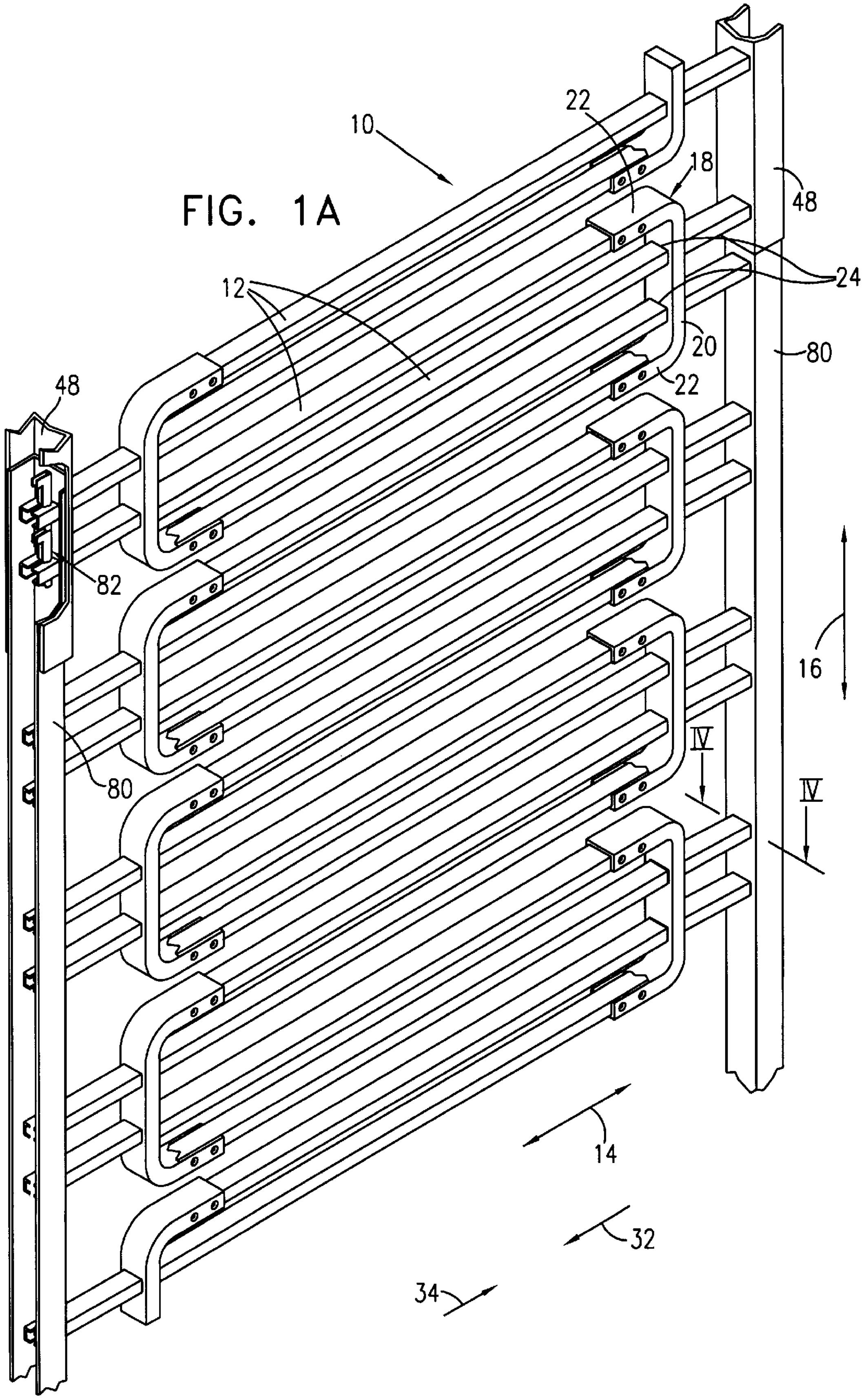
FIGS. 1A and 1B are simplified pictorial illustrations of a barrier, constructed and operative in accordance with a preferred embodiment of the present invention, respectively in unextended and extended orientations.
Figure 1B:
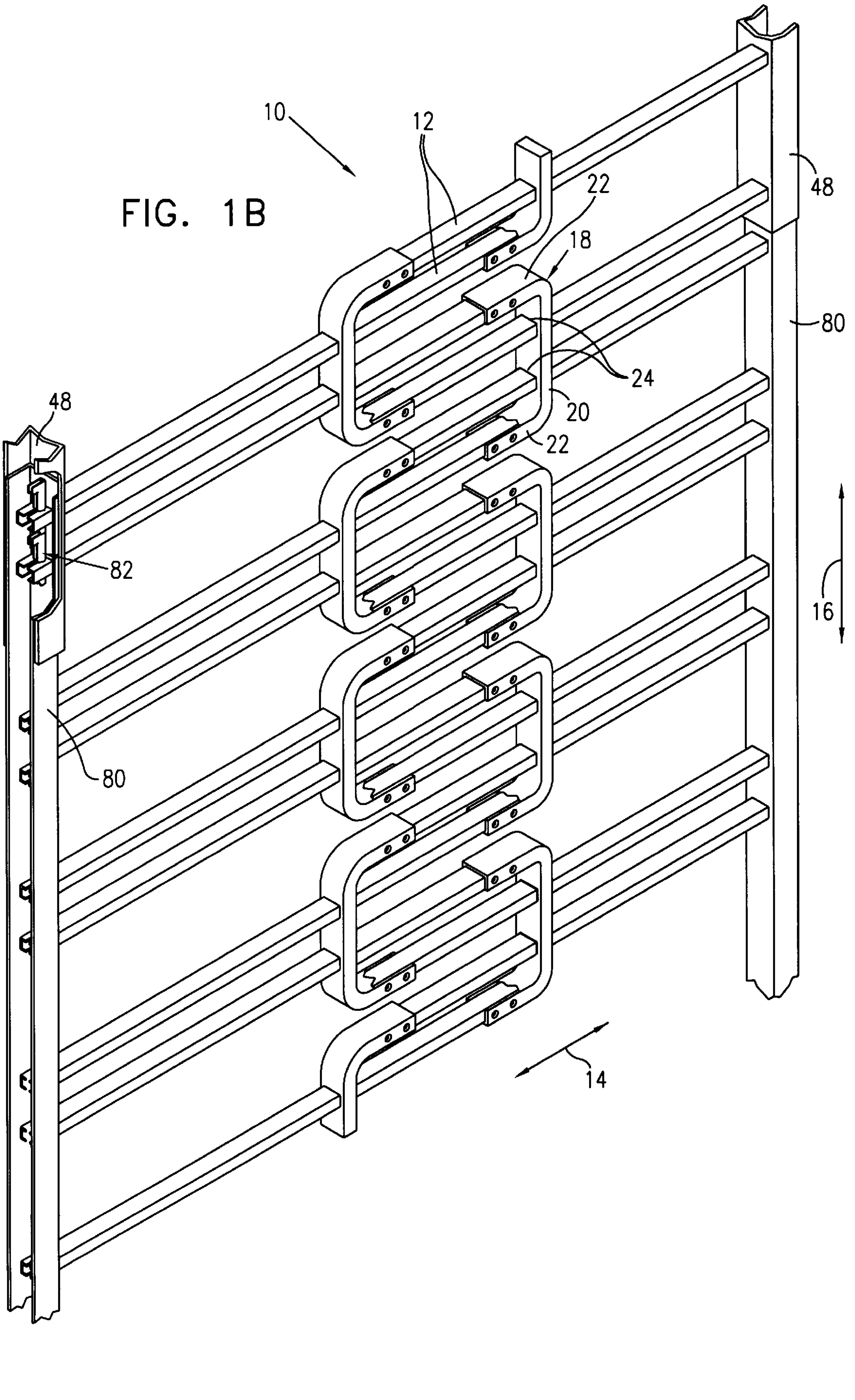
Figures 2, 3, 4:
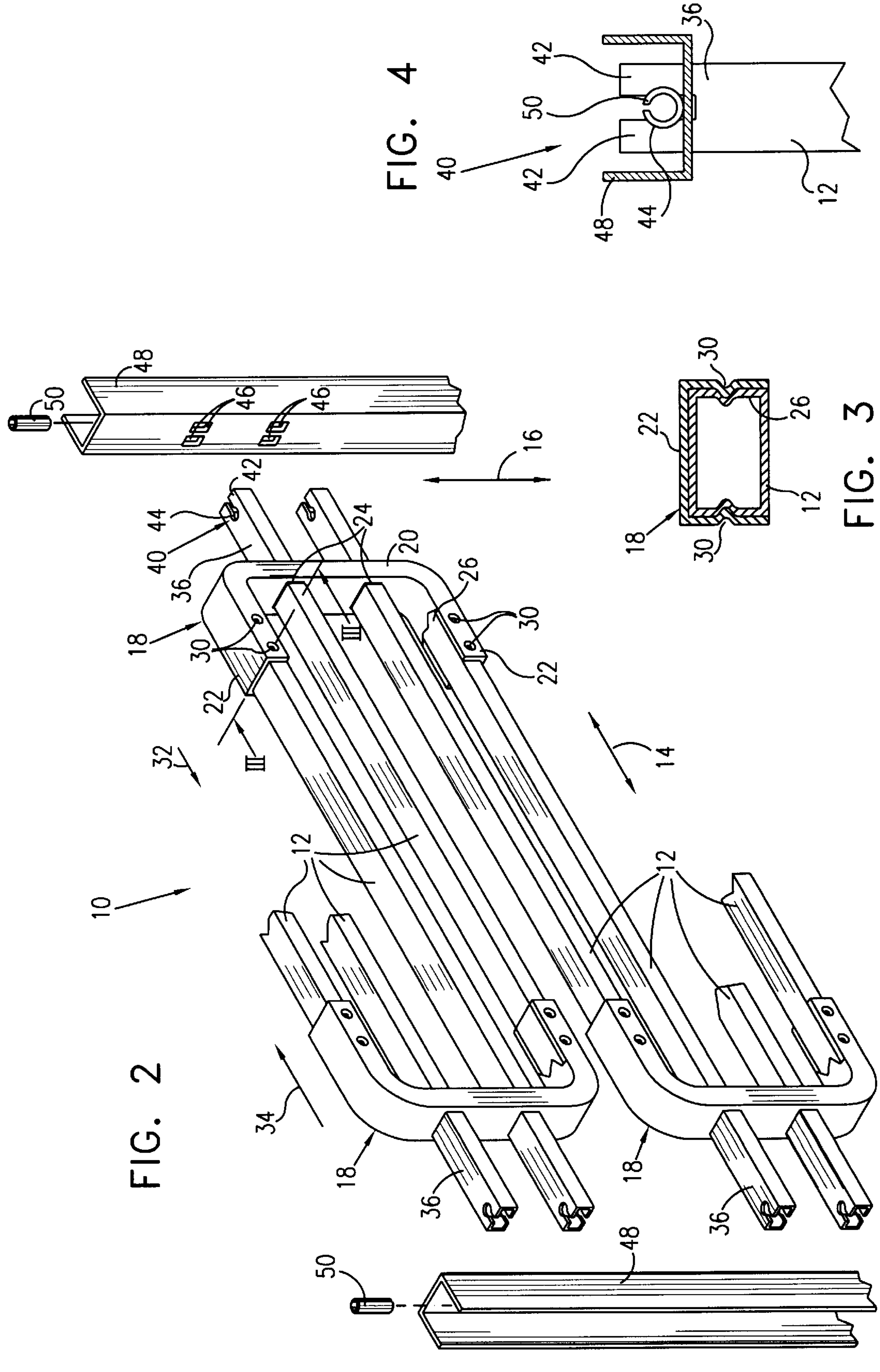
FIG. 2 is a simplified, partially exploded pictorial illustration of a portion of the barrier of FIG. 1, showing the extensibility of the barrier along a first axis.
FIG. 3 is a simplified sectional illustration of an attachment of a construction element with a bracket, taken along lines III—III in FIG. 2.
FIG. 4 is a simplified sectional illustration of an attachment of a construction element with a rail, taken along lines IV—IV in FIG. 1A.

Reference is now made to FIGS. 1A, 1B and 2 which illustrate a barrier 10, constructed and operative in accordance with a preferred embodiment of the present invention.

Barrier 10 preferably includes a plurality of elongate construction elements 12 extending along a first axis 14 and spaced from each other along a second axis 16 substantially perpendicular to first axis 14. Each construction element 12 may be made of a hollow bar, typically, but not necessarily, having a rectangular cross section. Construction elements 12, as well as the other components of barrier 10, are preferably made of a sturdy, durable material, such as galvanized steel.

Barrier 10 preferably includes a plurality of brackets 18. Each bracket 18 includes a back 20 and two legs 22. Back 20 is formed with at least one, and preferably two passageways 24. As seen clearly in FIG. 2, each leg 22 preferably fixedly receives therein an end 26 of one of the construction elements 12 and the rest of construction element 12 slidingly passes through one passageway 24 of a second bracket 18. End 26 may be fixed to bracket 18 in any conventional manner, such as bonding or riveting. Alternatively, dimples 30 may be stamped in the sides of bracket 18 which protrude inwards against end 26 and press tightly thereagainst, as seen by referring additionally to the sectional illustration of FIG. 3. As seen in FIGS. 1A and 2, the legs of each bracket 18 which fixedly receive ends 26 of construction elements 12 face in a first direction, designated by an arrow 32, along first axis 14, while the legs of a second bracket 18 through which the construction element 12 slides, face in a second direction along first axis 14, designated by an arrow 34, opposite to the first direction.

As seen in FIG. 2, an end 36 of each construction element 12 is preferably formed with a tenon 40 having two protruding members 42 and a hole 44 formed therein. Protruding members 42 of tenon 40 mate with corresponding apertures 46 formed through a thickness of a rail 48 which extends along second axis 16. Apertures 46 are spaced from each other in correspondence with the spacing of construction elements 12. Referring additionally to FIG. 4, it is seen that each tenon 40 mates with and protrudes through a corresponding aperture 46 such that construction element 12 abuts rail 48 and hole 44 protrudes beyond the thickness of rail 48. Construction element is fastened to rail 48 by means of a grooved pin fastener 50, also called a C-pin fastener. Grooved pin fasteners are well known and commercially available from a variety of manufacturers, such as those manufactured by JOHN GILLEN CORP., West Cicero, Ill., USA. As seen in FIG. 4, each grooved pin fastener 50 mates with a corresponding hole 44 so as to attach each construction element 12 with rail 48 substantially fixedly along first axis 14 and permitting rotational movement of each construction element 12 about second axis 16.

FIG. 1A illustrates barrier 10 in an unextended orientation, whereas FIG. 1B illustrates barrier 10 in an extended orientation.

Figure 5:
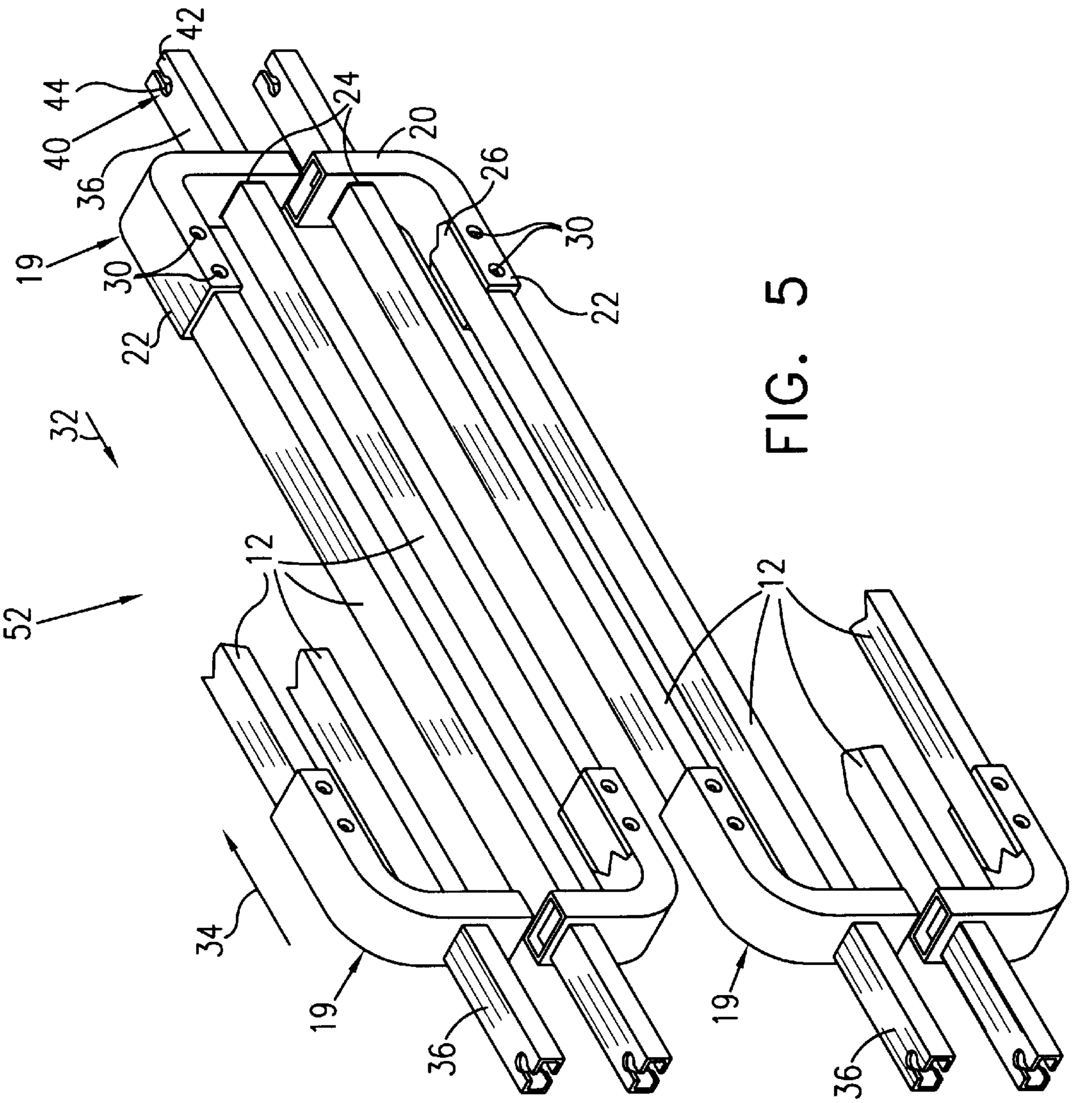
FIG. 5 is a simplified, partially exploded pictorial illustration of a barrier, constructed and operative in accordance with another preferred embodiment of the present invention.

Reference is now made to FIG. 5 which illustrates a barrier 52, constructed and operative in accordance with another preferred embodiment of the present invention. Barrier 52 is substantially similar to barrier 10 except that the bracket 18 of FIG. 2 has been replaced by a modified bracket 19 with only one aperture 24 for passage therethrough of a construction element 12.

Figure 6:
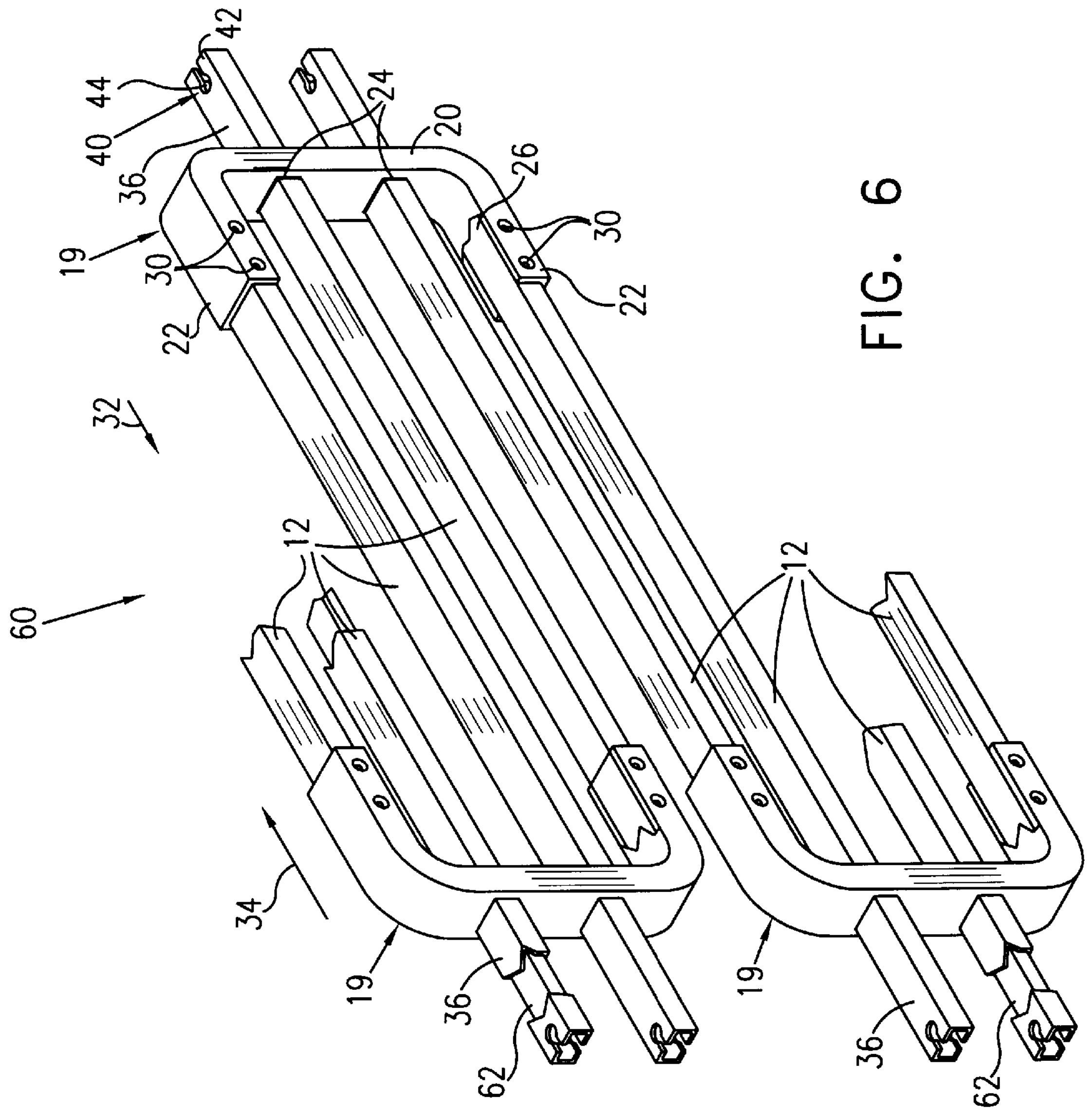
FIG. 6 is a simplified pictorial illustration of a barrier, constructed and operative in accordance with another preferred embodiment of the present invention, with solid filler material inside the construction elements.

Reference is now made to FIG. 6 which illustrates a barrier 60, constructed and operative in accordance with another preferred embodiment of the present invention. Barrier 60 is preferably substantially similar to barrier 10, except that construction elements 12 are filled with a solid filler material 62, such as a steel bar, for added strength against forced entry.

Figure 7:
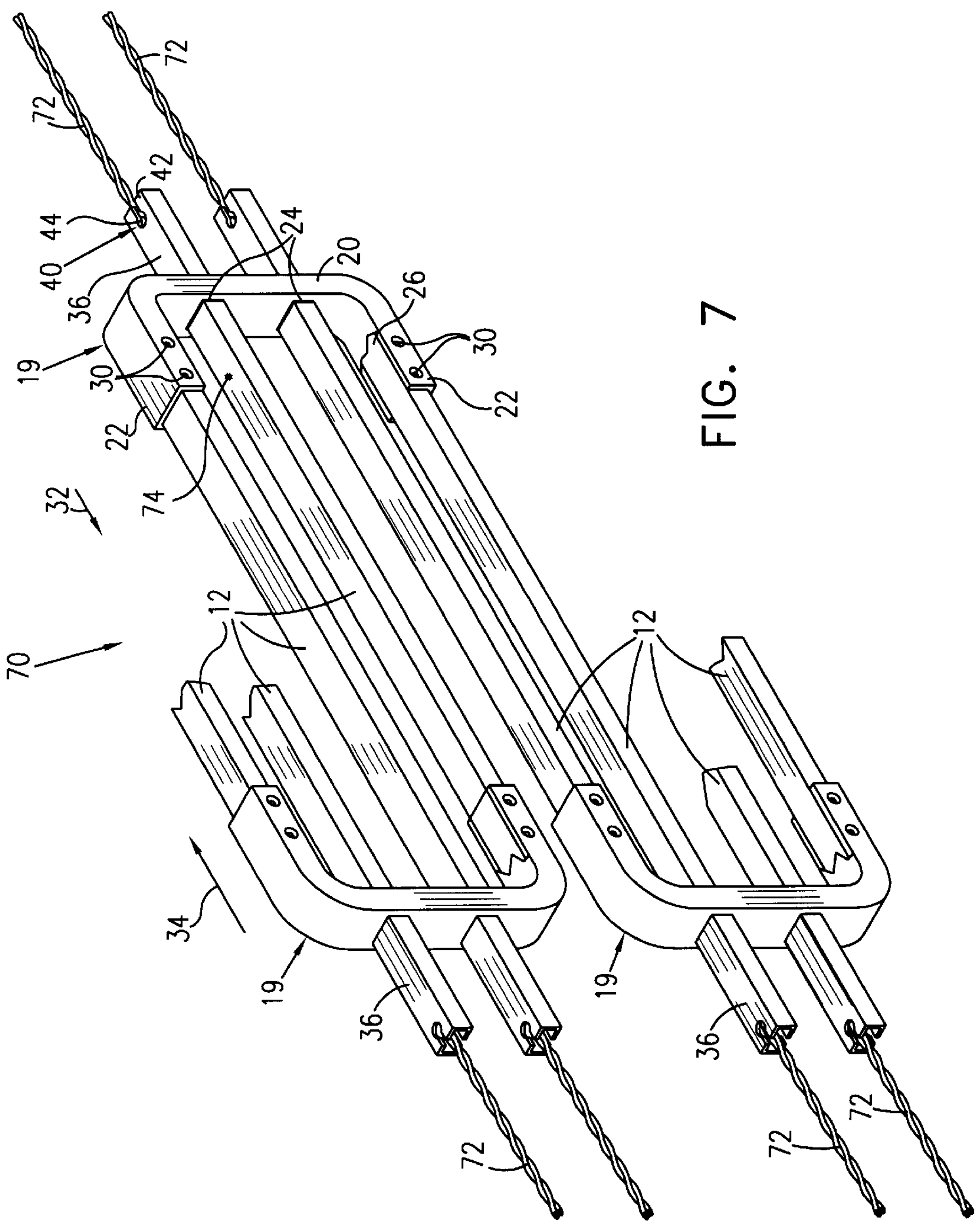
FIG. 7 is a simplified pictorial illustration of a barrier, constructed and operative in accordance with yet another preferred embodiment of the present invention, with electrical wires running through the construction elements.

Reference is now made to FIG. 7 which illustrates a barrier 70, constructed and operative in accordance with yet another preferred embodiment of the present invention. Barrier 70 is preferably substantially similar to barrier 10, except that electrical wires 72 run through construction elements 12. Wires 72 may be connected to an alarm system (not shown). Additionally, an intrusion sensor 74 may be mounted on any suitable portion of barrier 70 and electrically connected to the alarm system. Intrusion sensor 74 may include any kind of sensor suitable for sensing a vibratory disturbance of a would-be intruder, such as vibration of construction elements 12. For example, a piezoelectric or microphonic sensor, such as sensors marketed under the trademark EFLEX, available from MAGAL SECURITY SYSTEMS LTD. of Yahud, Israel, may be attached to construction elements 12, or any other suitable portion of barrier 70. Another example is a vibration sensitive fiber optic sensor, commercially available from such manufacturers as FIBER SENSYS INC., Beaverton, Oreg., USA. Most preferably intrusion sensor 74 is mounted on construction elements 12 so as to exploit the sliding and moving structure of barrier 70.

Figure 8:
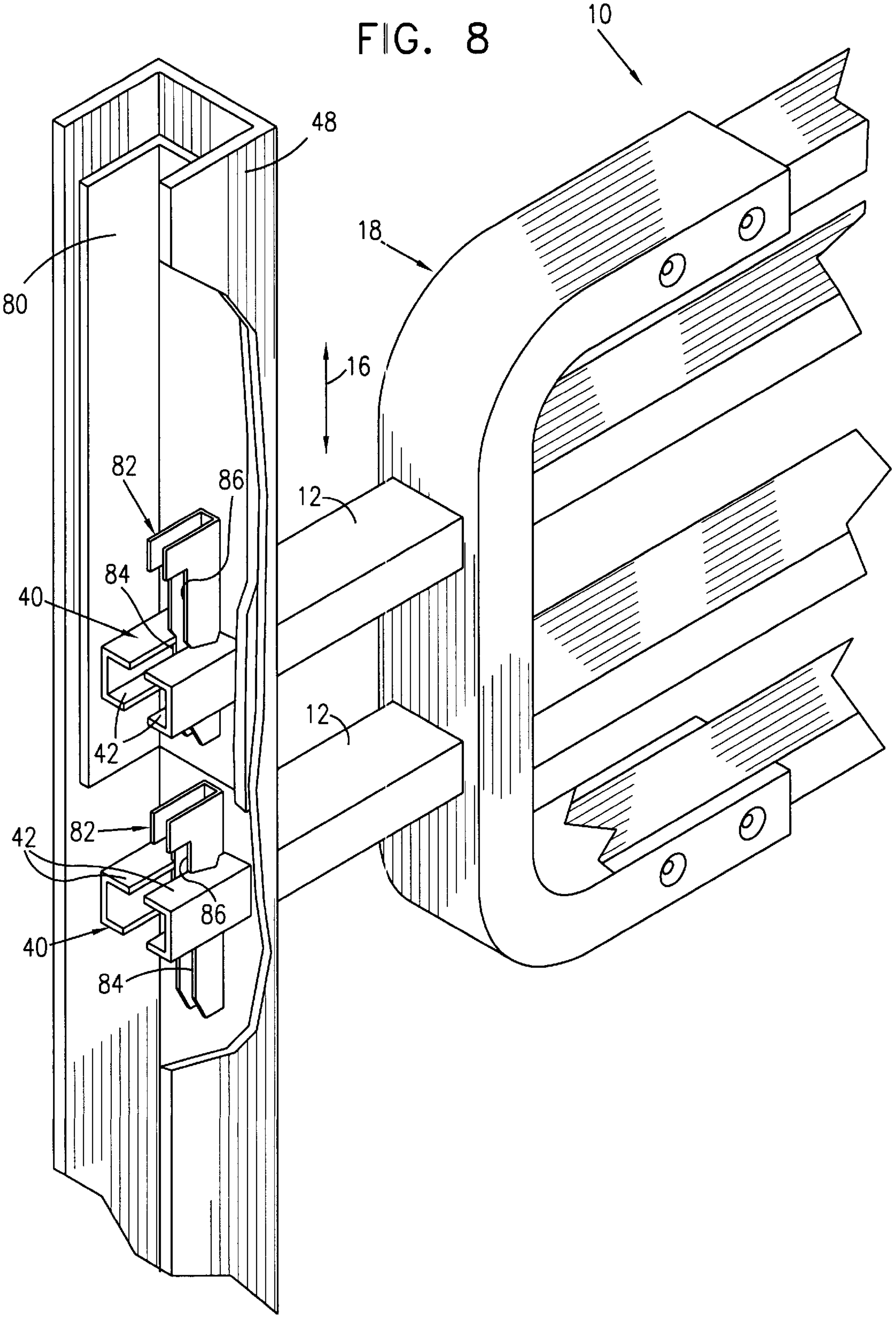
FIG. 8 is a simplified, partially exploded pictorial illustration of another portion of the barrier of FIG. 1, showing the extensibility of the barrier along a second axis and employing a locking member.

Reference is now made to FIG. 8 which illustrates another portion of barrier 10 of FIG. 1, showing the extensibility of barrier 10 along second axis 16. In accordance with a preferred embodiment of the present invention, an extensor rail 80 may be nestingly attached to rail 48 along second axis by means of a locking member 82. Locking member 82 is preferably somewhat L-shaped and snugly fits between protrusions 42 of tenon 40 of construction element 12. In this attachment, extensor rail 80 abuts a surface 84 of locking member 82. As seen in FIG. 8, locking member 82 may also be used to fixedly attach tenon 40 of construction element 12 together with rail 48, without extensor rail 80. In this attachment, rail 48 abuts a surface 86 of locking member 82.

As mentioned hereinabove, the barriers of the present invention encompass not just barriers, but also fences, gates, window barriers, cages, enclaves and flower bed holders, for example. Another example is a fence railing, such as around a patio of a dwelling, which can be extended/adjusted in two directions (first and second axes 14 and 16).

Figure 9:
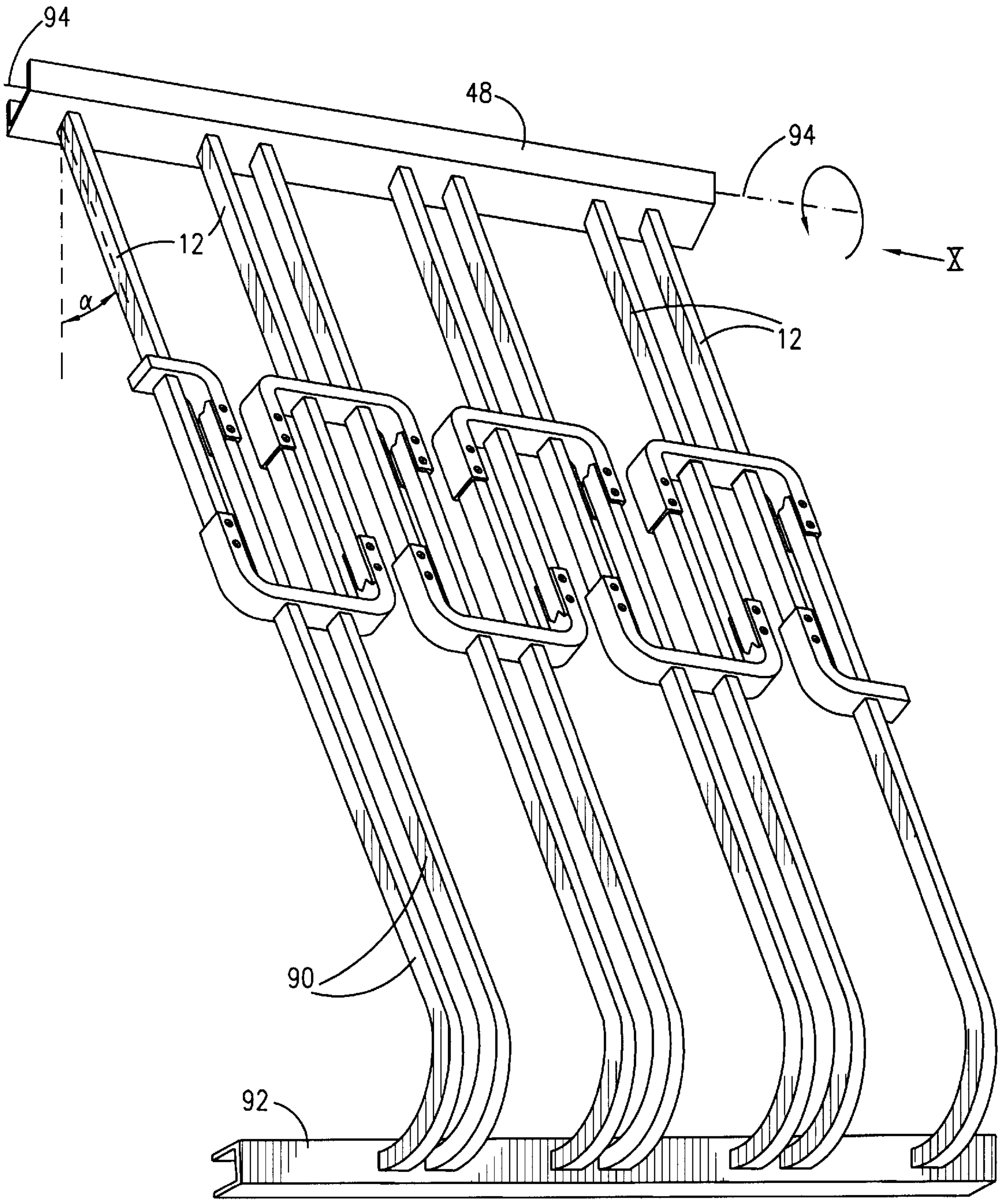
FIG. 9 is a simplified pictorial illustration of an arcuate construction member constructed and operative in accordance with a preferred embodiment of the present invention.
Figure 10:
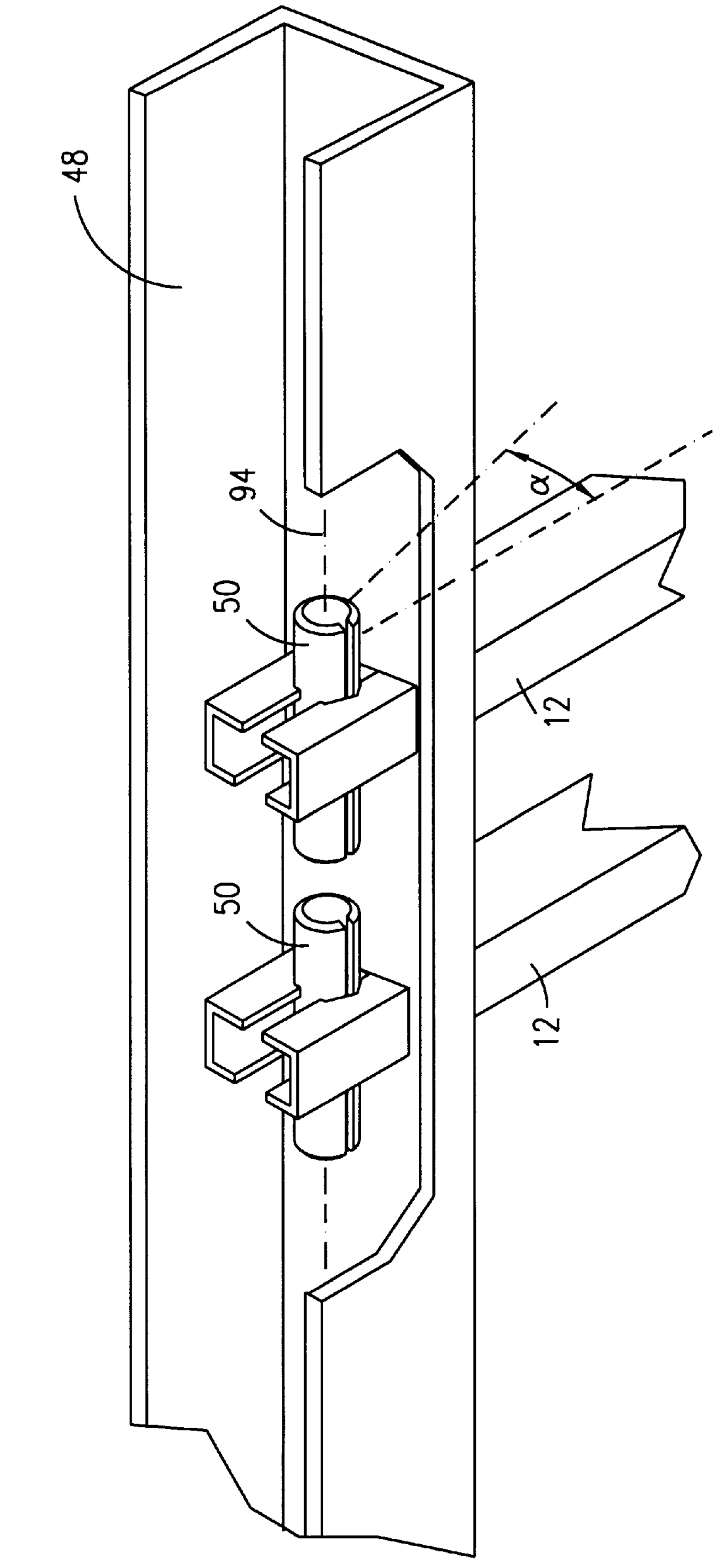
FIG. 10 is a simplified pictorial illustration of a portion of FIG. 9, viewed along arrow X in FIG. 9.

Reference is now made to FIG. 9 which illustrates an arcuate construction member 90 constructed in accordance with a preferred embodiment of the present invention. By using arcuate construction member 90 in place of construction element 12, a barrier with a "belly protrusion" may be constructed. Such barriers are, for example, particularly popular for barring children from windows, while at the same time providing available space for placing objects on a window sill. One end of construction member 90 may be attached to an auxiliary rail 92 with a grooved pin fastener 50 (not seen in FIG. 9) as described hereinabove for attaching a construction element 12 to rail 48. Referring additionally to FIG. 10, it is seen that construction elements 12 which are attached to rail 48, rotate about a longitudinal axis 94 of grooved pin fasteners 50, so that construction elements 12 are tilted at an angle a with respect to rail 48.

It will be appreciated by persons skilled in the art that the present invention is not limited by what has been particularly shown and described hereinabove. Rather the scope of the present invention includes both combinations and subcombinations of the features described hereinabove as well as modifications and variations thereof which would occur to a person of skill in the art upon reading the foregoing description and which are not in the prior art.

What is claimed is:

1. A barrier comprising:

a plurality of elongated construction elements extending along a first axis and spaced from each other along a second axis substantially perpendicular to the first axis, said construction elements being telescopically extensible along the first axis, and an end of each construction element being formed with a tenon, the tenon being formed with a hole therein;

at least one rail extending along the second axis, a plurality of apertures being formed through a thickness of the at least one rail and spaced from each other in correspondence with the spaced construction elements, each tenon mating with and protruding through a corresponding one of the apertures such that the construction element abuts the at least one rail and the hole of the tenon protrudes beyond the thickness of the at least one rail;

a plurality of fasteners, each fastener mating with a corresponding one of the holes so as to attach each construction element with the at least one rail substantially fixedly along said first axis and permitting rotational movement of each construction element about said second axis; and a plurality of brackets, each said bracket comprising a back and at least one leg, the back being provided with at least one passageway, wherein at least one of the construction elements is fixedly attached at one of its ends to a leg of a first one of the brackets, the at least one leg of the first bracket facing a first direction along said first axis, and said at least one of the construction elements slidingly passes through said at least one passageway of a second one of the brackets, the at least one leg of the second bracket facing a second direction along said first axis, opposite to said first direction.

2. A barrier comprising:

a plurality of elongated construction elements extending along a first axis and spaced from each other along a second axis substantially perpendicular to the first axis, said construction elements being telescopically extensible along the first axis, and an end of each construction element being formed with a tenon, the tenon being formed with a hole therein;

at least one rail extending along the second axis, a plurality of apertures being formed through a thickness of the at least one rail and spaced from each other in correspondence with the spaced construction elements, each tenon mating with and protruding through a corresponding one of the apertures such that the construction element abuts the at least one rail and the hole of the tenon protrudes beyond the thickness of the at least one rail;

a plurality of fasteners, each fastener mating with a corresponding one of the holes so as to attach each construction element with the at least one rail substantially fixedly along said first axis and permitting rotational movement of each construction element about said second axis; and at least one extensor rail which mates with said at least one rail along said second axis, and a locking member which is fixedly attachable to said at least one rail, said at least one extensor rail and at least one of said construction elements.

3. The barrier according to claim 2 wherein said locking member comprises an elongate portion sized to fit in a tenon of said at least one construction element, said elongate portion having a first mating surface and a second mating surface, wherein if said locking member fixedly attaches said at least one rail to said at least one construction element then said first mating surface abuts a portion of said tenon of said construction element, and if said locking member fixedly attaches said at least one rail and said at least one extensor rail to said at least one construction element then said second mating surface abuts a portion of said tenon of said construction element.

4. The barrier according to claim 1 wherein each said construction element is hollow.

5. The barrier according to claim 4 wherein said construction element is reinforced with a filler disposed therein.

6. The barrier according to claim 4 wherein said construction element comprises electrical wiring disposed therein.

7. The barrier according to claim 1 and wherein at least one of said construction members is arcuate in shape.

8. The barrier according to claim 1 and comprising an intrusion sensor attached to a portion of said barrier.

9. The barrier according to claim 2 wherein each said construction element is hollow.

10. The barrier according to claim 9 wherein said construction element is reinforced with a filler disposed therein.

11. The barrier according to claim 9 wherein said construction element comprises electrical wiring disposed therein.

12. The barrier according to claim 2 and wherein at least one of said construction members is arcuate in shape.

13. The barrier according to claim 2 and comprising an intrusion sensor attached to a portion of said barrier.

* * * * *

UNITED STATES PATENT AND TRADEMARK OFFICE

CERTIFICATE OF CORRECTION

PATENT NO. : 6,036,176

DATED : March 14, 2000

INVENTOR(S) : Rotshtain

It is certified that error appears in the above-identified patent and that said Letters Patent is hereby corrected as shown below:

On the Title Page, under the section titled FOREIGN PATENT DOCUMENTS, insert "DE " before 2801566 to read as - - DE 2801566 - -.

In the cover page, under the section titled FOREIGN PATENT DOCUMENTS, insert "DE " before 3108394 to read as - - DE 3108394 - -.

In column 5, line 4, change "a" to read as - - α - -.

Signed and Sealed this

Twenty-seventh Day of March, 2001

Attest:

Nicholas P. Godici

NICHOLAS P. GODICI

*Attesting Officer*

*Acting Director of the United States Patent and Trademark Office*